United States Patent [19]

Chang

[11] 4,273,753

[45] Jun. 16, 1981

[54] DE-ALUMINIZATION OF ALUMINOSILICATES

[75] Inventor: Clarence D. Chang, Princeton, N.J.

[73] Assignee: Mobil Oil Corporation, New York, N.Y.

[21] Appl. No.: 74,174

[22] Filed: Sep. 10, 1979

[51] Int. Cl.$^3$ .............................................. C01B 33/28
[52] U.S. Cl. ................................. 423/328; 252/455 Z
[58] Field of Search ....................... 423/328, 135, 136; 252/455 R, 455 Z

[56] References Cited

U.S. PATENT DOCUMENTS

| | | | |
|---|---|---|---|
| 1,528,039 | 3/1925 | Wolcott | 423/135 |
| 3,442,795 | 5/1969 | Kerr et al. | 252/455 Z X |
| 3,466,169 | 9/1969 | Nowak et al. | 423/136 X |
| 3,640,681 | 2/1972 | Pickert | 252/455 Z X |
| 3,937,791 | 2/1976 | Garwood et al. | 423/328 |

FOREIGN PATENT DOCUMENTS 2510740  9/1976  Fed. Rep. of Germany ........... 423/328

OTHER PUBLICATIONS

Barber et al. "J. Chem. Soc. (A)", 1970, pp. 765-775.

*Primary Examiner*—Edward J. Meros
*Attorney, Agent, or Firm*—Charles A. Huggett; Charles J. Speciale; George W. Allen

[57] ABSTRACT

A process for the de-aluminization of aluminosilicates such as zeolites, clays, gels, amorphous silica-aluminas and crystalline silica-aluminas. The process comprises contacting an aluminosilicate with an inorganic halide or oxyhalide at a temperature sufficiently high enough to volatilize the aluminum halide or oxyhalide which is formed.

18 Claims, No Drawings

DE-ALUMINIZATION OF ALUMINOSILICATES

BACKGROUND OF THE INVENTION

1. Field of the Invention

This invention relates to the removal of aluminum from aluminosilicate compositions, especially from crystalline aluminosilicate zeolites. In a particular aspect, this invention is related to increasing the silica to alumina mole ratio of aluminosilicates.

2. Description of the Prior Art

Considerable effort has been devoted to the improvement of natural and synthetic aluminum-containing oxides such as clays, gels, aluminosilicates and the like with regard to pore structure, crystalline form, catalytic and adsorptive activity and thermal, hydrothermal and acid stability. Substantial incentive for this endeavor results from the broad application that such compositions have found as adsorbents, catalysts and ion exchange media in numerous chemical and hydrocarbon conversion and process systems. It is often the case that the chemical, physical and catalytic properties of these materials deteriorate on exposure to process environments, particularly those involving elevated temperatures, acidic process media or contact with steam. For example, the crystallinity and catalytic activity of aluminosilicate hydrocracking catalysts are known to deteriorate on exposure to repeated regeneration which often involves exposing the catalyst to an extreme temperature capable of burning off deposited coke and residual hydrocarbon. The regeneration of such cracking catalysts generally requires that the catalyst be able to withstand steam and/or thermal atmospheres at temperatures in a range of 1,300°-1,700° F. These compositions must also be able to withstand the chemically degrading influence of acidic materials such as the sulfur and nitrogen oxides encountered during regeneration of some systems.

The crystalline aluminosilicate zeolites represent a class of porous refractory inorganic oxides in which there is currently considerable interest in these and other respects. One factor that is known to influence the tolerance of crystalline aluminosilicates to acidic and thermal environments is the structural silica to alumina mole ratio. For any given class of aluminosilicates, catalytic activity, thermal stability and resistance to acid and steam attack are known to improve as the structural $SiO_2/Al_2O_3$ mole ratio is increased. The value of procedures that are effective in increasing this ratio is therefore readily apparent.

In synthetic crystalline aluminosilicate zeolites, the silica to alumina mole ratio is essentially determined by the nature of the starting materials and the relative quantities of such materials used in the preparation of the zeolite. Some variation in the silica to alumina mole ratio can be obtained by changing the proportion of reactants, e.g., increasing the relative concentration of the silica precursor relative to the alumina precursor. However, definite limits in the maximum obtainable silica to alumina mole ratio are observed. For example, synthetic faujasites having a silica to alumina mole ratio of about 5.2 to 5.6 can be obtained by increasing the relative proportion of the silica precursor. However, when the silica proportion is increased to even higher levels no commensurate increase in the silica to alumina mole ratio of the crystallized synthetic faujasite is observed. Thus, the silica to alumina mole ratio of about 5.6 must be considered an upper limit in a preparative process using conventional reagent. Corresponding upper limits in the silica to alumina mole ratio of mordenite and erionite via the synthetic pathway are also observed.

Accordingly, attempts to increase the silica to alumina mole ratio of crystalline zeolites by removal of aluminum from the crystal structure with strong acids have heretofore been reported. Further, the silica to alumina mole ratio of zeolites have been increased by converting the parent zeolite at least partially to its hydrogen form, hydrolyzing the aluminum to aluminum hydroxide, and thereafter physically removing the displaced aluminum.

U.S. Pat. No. 3,442,795 describes a process for preparing highly siliceous zeolite-type materials from crystalline aluminosilicates by means of a solvolysis technique, e.g. hydrolysis, followed by a chelation technique. In this disclosure, the acid form of a zeolite, e.g. zeolite Z, is subjected to a solvolysis technique such as hydrolysis, to remove aluminum from the aluminosilicate. The aluminum can then be physically separated from the aluminosilicate by the use of complexing or chelating agents such as ethylenediaminetetraacetic acid or carboxylic acid, to form aluminum complexes which are readily removable from the aluminosilicate. Ultra high silicon-content zeolites and preparation thereof are disclosed in U.S. Pat. No. 4,093,560.

A method of abstracting structural aluminum from aluminosilicates, thereby increasing the structural silica to alumina mole ratio while maintaining the ordered internal crystalline structure of the aluminosilicate is disclosed in U.S. Pat. No. 3,691,099. In said patent, the aluminosilicate is contacted with a mildly acidic solution containing at least one water soluble salt of a cation exchangeable with said aluminosilicate at a sufficient temperature and for a sufficient amount of time.

In U.S. Pat. No. 3,937,791, a method is described for removing alumina from a crystalline aluminosilicate. This method comprises heating said aluminosilicate to a temperature in the range between about 50° C. and 100° C. in the presence of a cationic form of chromium in an aqueous solution of above 0.01 Normal of a chromium salt of a mineral acid whereby the pH is less than 3.5, and such that the atomic ratio of chromium to aluminum is greater than 0.5.

A method for increasing the silica to alumina mole ratio of a crystalline aluminosilicate zeolite by contacting said zeolite with water at elevated temperature and then treating to remove alumina from the crystal lattice is disclosed in U.S. Pat. No. 3,591,488. Following the high temperature water treatment, amorphous alumina is removed from the zeolite material by contacting with a dilute mineral acid or an organic acid chelating agent.

In U.S. Pat. No. 3,640,681, framework aluminum is extracted from crystalline zeolites using acetylacetone as the extracting agent. Prior to contact with the acetylacetone, the zeolite must be rendered substantially cation-deficient and at least partially dehydroxylated. Other metals can be substituted for the extracted framework aluminum by contacting the zeolite with a metal acetylacetone.

The treatment of zeolites with gaseous chlorine compounds such as $Cl_2$ or $HCl$ to remove $AlCl_3$ is described in Ger. Offen. No. 2,510,740.

SUMMARY OF THE INVENTION

The instant invention concerns a process for the de-aluminization of aluminosilicates such as zeolites, clays, gels, amorphous silica-aluminas and crystalline silica-aluminas. Said process comprises contacting an aluminosilicate with an inorganic halide or oxyhalide at temperatures sufficiently high to volatilize the resultant aluminum halide or aluminum oxyhalide which is formed. The aluminum halide or aluminum oxyhalide is then removed as a vapor.

DESCRIPTION OF PREFERRED EMBODIMENTS

It has now been discovered that aluminosilicates can be dealuminized without substantially destroying its structure by high temperature treatment of the aluminosilicate with volatilized inorganic halides and oxyhalides.

Aluminosilicates comprise both natural and synthetic materials, as well as both amorphous and crystalline materials. Examples of aluminosilicates include zeolites, clays, gels, crystalline silica-aluminas and amorphous silica-aluminas.

Zeolites can be described as crystalline aluminosilicates consisting of a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate zeolite by suitable selection of the cation. The spaces between the tetrahedra are occupied by molecules of water prior to dehydration.

Prior art technique have resulted in the formation of a great variety of synthetic zeolites. These zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752) zeolite ZSM-5 (U.S. Pat. No. 3,702,886), zeolite ZSM-11 (U.S. Pat. No. 3,709,979), zeolite ZSM-12 (U.S. Pat. No. 3,832,449) and zeolite ZSM-20 (U.S. Pat. No. 3,972,983), merely to name a few.

Clay materials for use in the present invention include compositions composed primarily of clay minerals identified as hydrated aluminum silicates having the general formula $Al_2O_3 \cdot xSiO_2 \cdot yH_2O$ wherein x is an integer of from about 0.5 to about 600 and y, depending upon the state of hydration of the clay materials, is from about 1 to about 300, and wherein said hydrated aluminum silicate clay mineral may have associated therewith, for example, one or more metals or metal oxides selected from the group consisting of Group IA, IIA and VIII of the Periodic Table of Elements. Non-limiting examples of such hydrated aluminum silicate minerals which comprise the major proportion of clays for use in the present invention include:

kaolinite ($Al_2O_3 \cdot 2SiO_2 \cdot nH_2O$), halloysite ($Al_2O_3 \cdot 3SiO_2 \cdot nH_2O$), montmorillonite (($Mg, Ca)O \cdot Al_2O_3 \cdot 5SiO_2 \cdot nH_2O$) and illite ($K_2O, MgO, Al_2O_3, SiO_2, H_2O$; all in variable amounts).

The quantity "n" of the above general formulas depends upon the degree of hydration of the particular clay mineral and will most often be between about 1 and about 300. Since the clay mineral for use herein must not be heated to a temperature exceeding 100° C. prior to or during ion exchange, "n" will seldom be below about 1.

Non-limiting examples of clays for use in the present invention include:

fuller's earth—a clay material having high natural adsorptive powers which is usually composed largely of the clay mineral attapulgite with some montmorillonite.

kaolin—a clay material being mainly constituted of the mineral kaolinite, and bentonite—a clay containing appreciable amounts of the clay mineral montmorillonite and usually having some magnesium and iron associated therewith.

The useful halogen component of the inorganic halides and oxyhalides utilized in the present invention comprise chlorine, bromine and iodine. The order of preference for these halogens is in the order of the boiling points of the resultant aluminum halide formed, with the halogen with the corresponding lowest boiling point being preferred. Thus the order of preference would be chlorine, bromine and iodine.

Non-limiting examples of inorganic halides and oxyhalides useful in the instant invention include $SiCl_4$, $PCl_3$, $TiCl_4$, and $CrO_2Cl_2$, merely to name a few.

The temperature at which the de-aluminization will occur must be high enough to effect removal through vaporization of the aluminum halide formed. Minimum temperatures to effect this vaporization are dependent on the halogen moiety of the halide used. The following table (Table 1) gives suitable temperature ranges for the de-aluminization process of the present invention.

TABLE 1

| Halogen Moiety | Temperature Ranges, °C. | |
|---|---|---|
| | Preferred | More Preferred |
| Chlorine | 140–760 | 180–600 |
| Bromine | 150–800 | 260–700 |
| Iodine | 250–800 | 380–700 |

Thus to volatilize $Al_2Cl_6$ a temperature of at least about 140° C. is required; to volatilize $Al_2Br_6$ a temperature of at least about 150° C. is required; and to volatilize $Al_2I_6$ a temperature of at least about 250° C. is required.

The following reaction between aluminum (as $Al_2O_3$) and $SiCl_4$ typifies the novel process of the instant invention:

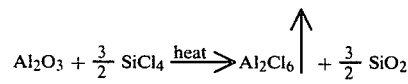

$$Al_2O_3 + \tfrac{3}{2} SiCl_4 \xrightarrow{heat} Al_2Cl_6 \uparrow + \tfrac{3}{2} SiO_2$$

The removal of Al, especially from zeolites, tends to give greater stability. Without wishing to be bound by any particular theory of operability, it is believed that the non-halogen component of the halide or oxyhalide is deposited at the site previously occupied by the aluminum. Thus it is felt that this method leads to even greater stabilization since the vacancy left by the Al is "filled" with another atom or molecule. Furthermore, this method can be used to introduce different atoms into the aluminosilicate structure, thus modifying catalytic function.

The improved characteristics of aluminosilicates treated in accordance with this invention, particularly those relating to increased $SiO_2/Al_2O_3$ mole ratios and hydrothermal stability renders them particularly attractive for application in a number of processes. Exemplary of such processes are the use of the resultant aluminosilicates as ion exchange media or as catalyst or catalyst supports in the conversion of organic compounds, particularly hydrocarbons. Exemplary of hydrocarbon conversion systems in which these compositions are particularly suitable are hydrocracking; cracking; hydrofining, e.g., desulfurization and denitrogenation; isomerization; polymerization; alkylation; reforming; hydrogenation; dehydrogenation and the like. Typical catalytic applications of such compositions is in the conversion of hydrocarbons by hydrofining and hydrocracking in which case the described aluminosilicates should contain a catalytically active amount of hydrogenation component such as the Group VI or Group VIII metals, oxides and sulfides. By using members of Groups IB, IIB, IV, V, VI and VIII with said aluminosilicates, other reactions can be carried out such as CO hydrogenation and oxidation; hydrocarbon oxidation, halogenation and nitration; and olefin hydration, merely to name a few.

It is also preferable when employing these aluminosilicates as catalysts or catalyst supports to render them in the form of relatively stable aggregates, e.g. pellets, tablets, extrudates and the like. The use of an added binder composition is usually preferred to improve the structural properties of the resultant aggregate. The binder compositions most commonly employed for aluminosilicates of this nature comprise predominantly alumina, certain forms of alumina being particularly preferred.

The following examples will serve to illustrate the invention without limiting same.

EXAMPLE 1

This example illustrates the preparation of a HZSM-5 zeolite with a silica to alumina mole ratio of about 40.

A sodium silicate solution was prepared by mixing 8.4 parts water and 14.4 parts sodium silicate (28.7 wt % $SiO_2$, 8.9 wt % $Na_2O$, 62.4% $H_2O$) followed by addition of 0.04 parts Daxad 27 (W. R. Grace Chem. Co.). The solution was cooled to approximately 15° C.

An acid solution was prepared by adding 1 part aluminum sulfate (17.2 wt % $Al_2O_3$) to 8.6 parts water followed by 0.96 parts sulfuric acid (93 wt % $H_2SO_4$) and 0.6 parts NaCl.

These solutions were mixed in an agitated vessel while 2.1 parts of NaCl and 0.4 parts $H_2O$ were added. The gel molar ratios expressed as oxides are the following:

$SiO_2/Al_2O_3 = 40.6$
$Na_2O/Al_2O_3 = 52.1$

An organic solution was prepared by adding 0.8 parts n-propyl bromide and 1.6 parts methyl ethyl ketone to 1.0 parts tri-n-propylamine and added to the gel.

The mixture was reacted at 220° F. without agitation for 6 hours, 151 hrs. with severe agitation and at 320° F. with severe agitation for 3 hours.

The zeolite slurry product was diluted with 4-5 parts water per part slurry and 0.0002 parts of flocculent (Rohm & Haas Primafloc C-7) per part slurry, allowed to settle and supernatant liquid was drawn off. The settled solids were reslurried to the original volume of the preceding step with water and 0.00005 parts of flocculent per part slurry. After settling, the aqueous phase was decanted. This procedure was repeated until the decant supernatant liquid was chlorine free. The washed zeolite was then filtered, dried and identified as ZSM-5 having a silica/alumina mole ratio of at least 12; i.e, about 40, and a constraint index of between 1 and 12; i.e., about 8.3.

The dried zeolite product was calcined in flowing $N_2$ for 3 hours at 538° C. then ion exchanged twice with 1 N $NH_4NO_3$ solution (5 parts $NH_4NO_3$ solution/1 part zeolite) for 1 hour at ambient temperature and dried at about 120° C.

EXAMPLE 2

The HZSM-5 zeolite prepared according to the procedure of Example 1 was treated with 250 torr $SiCl_4$ at 532° C. in a transport reactor. The use of a transport reactor is described by H. Schafer in CHEMICAL TRANSPORT REACTIONS, Academic Press, N.Y., 1964. The de-aluminization of this zeolite is demonstrated below in Table 2.

TABLE 2

| Time, hr | Δ Wt. % | % $Al_2O_3$ | $SiO_2/Al_2O_3$ | % De-aluminization |
|---|---|---|---|---|
| 0 | — | 3.89 | 39.4 | 0 |
| 24 | −5.4 | 3.87 | 41.1 | 0.5 |
| 94 | −0.9 | 1.65 | 93.7 | 57.6 |
| 123 | −0.2 | 1.54 | 99.7 | 60.4 |

EXAMPLE 3

This example illustrates the preparation of a HZSM-5 zeolite with a silica to alumina mole ratio of about 70.

A sodium silicate solution was prepared by mixing 16 parts water and 27.7 parts sodium silicate (28.7 wt % $SiO_2$, 8.9 wt % $Na_2O$, 62.4% $H_2O$). The solution was cooled to approximately 15° C.

An acid solution was prepared by adding 1 part aluminum sulfate (17.2 wt % $Al_2O_3$) to 16.4 parts water followed by 2.4 parts sulfuric acid (93 wt % $H_2SO_4$) and 1.2 parts NaCl.

These solutions were mixed in an agitated vessel while 3.9 parts of NaCl were added. The gel molar ratios expressed as oxides are the following:

$SiO_2/Al_2O_3 = 78.4$
$Na_2O/Al_2O_3 = 49.9$

An organic solution was prepared by adding 1.6 parts n-propyl bromide and 3.1 parts methyl ethyl ketone to 1.9 parts tri-n-propylamine.

After the gel was heated to about 95° C., agitation was reduced and the organic solution was added above the gel. This mixture was held at about 95°–110° C. for 14 hours, then agitation increased and the temperature was increased to about 150°–160° C. and held there until crystallization was complete. Unreacted organics were removed by flashing and the remaining contents cooled.

The zeolite slurry product was diluted with 4–5 parts water per part slurry, allowed to settle and supernatant liquid was drawn off. The settled solids were reslurried to the original volume of the preceding step with water. After settling, the aqueous phase was decanted. This procedure was repeated until the sodium level of the zeolite was less than 1.0 wt%. The washed zeolite was then filtered, dried and identified as ZSM-5 having a silica/alumina mole ratio of at least 12; i.e., about 70, and a constraint index of between 1 and 12; i.e., about 8.3.

EXAMPLE 4

The HZSM-5 zeolite prepared according to the procedure of Example 3 was treated with 250 torr $SiCl_4$ at 540° C. in a transport reactor. Increase in the silica to alumina mole ratio is shown in Table 3 below.

TABLE 3

| Hours on Stream | Silica to Alumina Mole ratio |
|---|---|
| 0 | 70 |
| 48 | 218 |
| 314 | 784 |

As can be seen from Table 3, after about 300 hours there was greater than a tenfold increase in the silica to alumina mole ratio.

EXAMPLE 5

This example demonstrates directly the reaction of aluminum (as $Al_2O_3$) and $SiCl_4$. A sample of gamma-$Al_2O_3$ from American Cyanamid Aero. Cat. was treated at about 540° C. in a transport reactor. After 71 hours the treated material was analyzed to be 13.2% $SiO_2$, while the sublimed material was analyzed as 36.9% $Al_2O_3$.

EXAMPLE 6

A sample of H-mordenite (Zeolon series, Norton Company, $SiO_2/Al_2O_3 = 12.2$) was treated at about 540° C. in a transport reactor for a period of one week with about 750 torr $SiCl_4$. Analysis of the treated material revealed a 20.2% de-aluminization.

What is claimed is:

1. A process for removing aluminum from crystalline aluminosilicate zeolites which comprises contacting a crystalline aluminosilicate zeolite with an inorganic halide or inorganic oxyhalide comprising a halogen and a non-halogen component to form an aluminum halide or aluminum oxyhalide and to deposit said non-halogen component in the crystalline aluminosilicate zeolite structure, at temperatures sufficiently high enough to volatilize the formed aluminum halide or aluminum oxyhalide and under conditions sufficient to remove the aluminum halide or aluminum oxyhalide from the crystalline aluminosilicate zeolite as a vapor.

2. The process of claim 1 wherein said halogen is selected from the group consisting of chlorine, bromine and iodine.

3. The process of claim 2 wherein said halogen is chlorine.

4. The process of claim 3 wherein said temperature is between about 140° C. and about 760° C.

5. The process of claim 4 wherein said temperature is between about 180° C. and about 600° C.

6. The process of claim 2 wherein said halogen is bromine.

7. The process of claim 6 wherein said temperature is between about 150° C. and about 800° C.

8. The process of claim 7 wherein said temperature is about 260° C. and about 700° C.

9. The process of claim 2 wherein said halogen is iodine.

10. The process of claim 9 wherein said temperature is between about 250° C. and about 800° C.

11. The process of claim 10 wherein said temperature is between about 380° C. and about 700° C.

12. The process of claim 1 wherein said inorganic halide is $SiCl_4$.

13. The process of claim 1 wherein said crystalline aluminosilicate zeolite is HZSM-5.

14. The process of claim 1 wherein said crystalline aluminosilicate zeolite is mordenite.

15. A process for increasing the silica to alumina mole ratio of crystalline aluminosilicate zeolites which comprises contacting a crystalline aluminosilicate zeolite with a silicon containing inorganic halide to form an aluminum halide and to deposit said silicon in said zeolite structure, at temperatures sufficiently high enough to volatilize the formed aluminum halide and under conditions sufficient to remove aluminum halide from the zeolite as a vapor.

16. The process of claim 15 wherein said halide is $SiCl_4$ and said temperature is in the range of between about 140° C. and 760° C.

17. The process of claim 16 wherein said temperature is between about 180° C. and 600° C.

18. The process of claim 15 wherein said crystalline aluminosilicate is HZSM-5.

* * * * *